United States Patent [19]

Krayenhagen

[11] Patent Number: 5,339,534
[45] Date of Patent: Aug. 23, 1994

[54] WARP MEASUREMENT DEVICE

[76] Inventor: Everett D. Krayenhagen, 1717 Capri La., Richmond, Ind. 47374-1503

[21] Appl. No.: 978,090

[22] Filed: Nov. 17, 1992

[51] Int. Cl.$^5$ ............................................. G01B 5/20
[52] U.S. Cl. .................................. 33/533; 33/555.4; 33/561.2
[58] Field of Search ................... 33/533, 501.1, 501.2, 33/501.4, 555.4, 561.1, 561.2, 561.3, 507

[56] References Cited

U.S. PATENT DOCUMENTS

| 950,285 | 2/1910 | Harper | 33/561.3 |
|---|---|---|---|
| 1,406,117 | 2/1922 | Vrooman | 33/561.3 |
| 2,470,697 | 5/1949 | Haederen | 33/561.2 |

FOREIGN PATENT DOCUMENTS

| 0650372 | 1/1929 | France | 33/561.2 |
|---|---|---|---|
| 2463389 | 2/1981 | France | 33/533 |
| 0006401 | 1/1988 | Japan | 33/561.1 |
| 1583731 | 8/1990 | U.S.S.R. | 33/561.1 |

Primary Examiner—William A. Cuchlinski, Jr.
Assistant Examiner—Alvin Wirthlin
Attorney, Agent, or Firm—Woodard, Emhardt, Naughton, Moriarty & McNett

[57] ABSTRACT

A device for measuring warpage of a surface is disclosed including a rigid support plate having first and second guide tracks attached thereto. A resiliently flexible band extends between the first and second guide tracks and includes first and second guides attached at ends of the band. A dial indicator is mounted to the rigid support plate for measuring deflection of the resiliently flexible band relative to the plate, wherein the dial indicator includes a probe attached to the flexible band for detecting deflection of the band relative to the plate. The flexible band resiliently deflects to conform to a warped surface when placed thereagainst, and the first and second guides reciprocate in the guide tracks as the band deflects to allow the band to conform to the warped surface. The band is of a predetermined length such that the dial indicator indicates deflection of the flexible band as a function of the predetermined length.

16 Claims, 5 Drawing Sheets

WARP MEASUREMENT DEVICE

BACKGROUND OF THE INVENTION

This invention relates generally to measurement instruments and more specifically to a device for use to measure warpage of a surface.

Various devices and methods have been developed for measuring warpage, or conversely flatness, of a surface. Typically, these measurement devices are used in a controlled environment. As a result, items requiring measurement must be transported to the measuring device. In many instances, however, it is desirable to have a portable measurement device which is easily transportable to the item, either because the item is not easily transported or unavailable for transport; i.e., an in-process item. For example, in the manufacture of corrugated webs or sheets, a transportable measurement device is desired which can be easily and quickly used for measuring in-process warpage.

In one specific example, in-process warp measurements are desired in the manufacture of corrugated cardboard to optimally adjust the amount of moisture content in the cardboard so as to minimize warpage resulting during its manufacture. One prior art warp measurement device employs a rule having a predetermined length which is placed across a portion of the cardboard. If the cardboard is warped, only the ends of the rule contact the cardboard thereby leaving a gap between the central portion of the cardboard and rule. The measured gap provides an indication of the warpage as a function of the predetermined length of the rule. Typically, a predetermined threshold level of warpage is acceptable in the manufacturing process. This predetermined level of warpage is expressed as a quality index; i.e., a dimensionless number such as "warpage per 12 inches of sheet." As such, it is desirable to have a portable warp measurement device which accurately measures warpage for a given length or width of sheet rather than as a function of the length of the rule, thereby facilitating immediate comparison with the quality index.

Current warp measurement devices are deficient in that they do not accurately measure warpage as a function of the length or width of sheet. For example, if warpage is measured using the above-described rule having a predetermined length of 12 inches, the indicated warpage will be in error since the actual length of the warped cardboard corresponding to the 12 inch rule will be slightly longer than 12 inches. Further, this error creates a false high reading of warpage. As a result, when comparing the measured warpage using prior art devices to a desired quality index, further correction factors must be applied to the measured warpage to provide an accurate indication of warpage corresponding to the quality index.

Therefore, an improved warp indicating device is desired. Such a device should provide an accurate indication of warpage for a given length or width of sheet. Such a device should be rugged so that it can be reliably used to measure warpage of a surface in a manufacturing environment. Such a device should also be inexpensive to manufacture to reduce cost and, thereby, increase its availability for use.

SUMMARY OF THE INVENTION

In one embodiment of the present invention, a device for use to measure warpage of a surface is disclosed, including a rigid support having a longitudinal axis and a resiliently flexible member. The flexible member includes a resiliently flexible central portion and ends which define a predetermined length therebetween and which are located equidistant from the longitudinal axis, wherein the central portion resiliently deflects to conform to a surface when placed thereagainst. Means for adjustably attaching the ends to the rigid support are included so that the ends are maintained parallel to the longitudinal axis as the central portion of the flexible member deflects. Also provided are means for measuring deflection of the flexible member as a function of its predetermined length, wherein the means for measuring include means for detecting and displaying deflection of the flexible member.

One object of the present invention is to provide an improved warp measurement device.

Another object of the present invention is to provide a warp measurement device which accurately indicates warpage for a given length or width of sheet.

Another object of the present invention is to provide a warp measurement device which is rugged so that it can be reliably used to measure warpage of a surface in a manufacturing environment.

Another object of the present invention is to provide a warp measurement device which is inexpensive to manufacture to reduce its purchase price and, thereby, increase its availability for use.

These and other related objects and advantages of the present invention will become apparent from the following drawings and written description.

DESCRIPTION OF TIE PREFERRED EMBODIMENT

Figure 1:
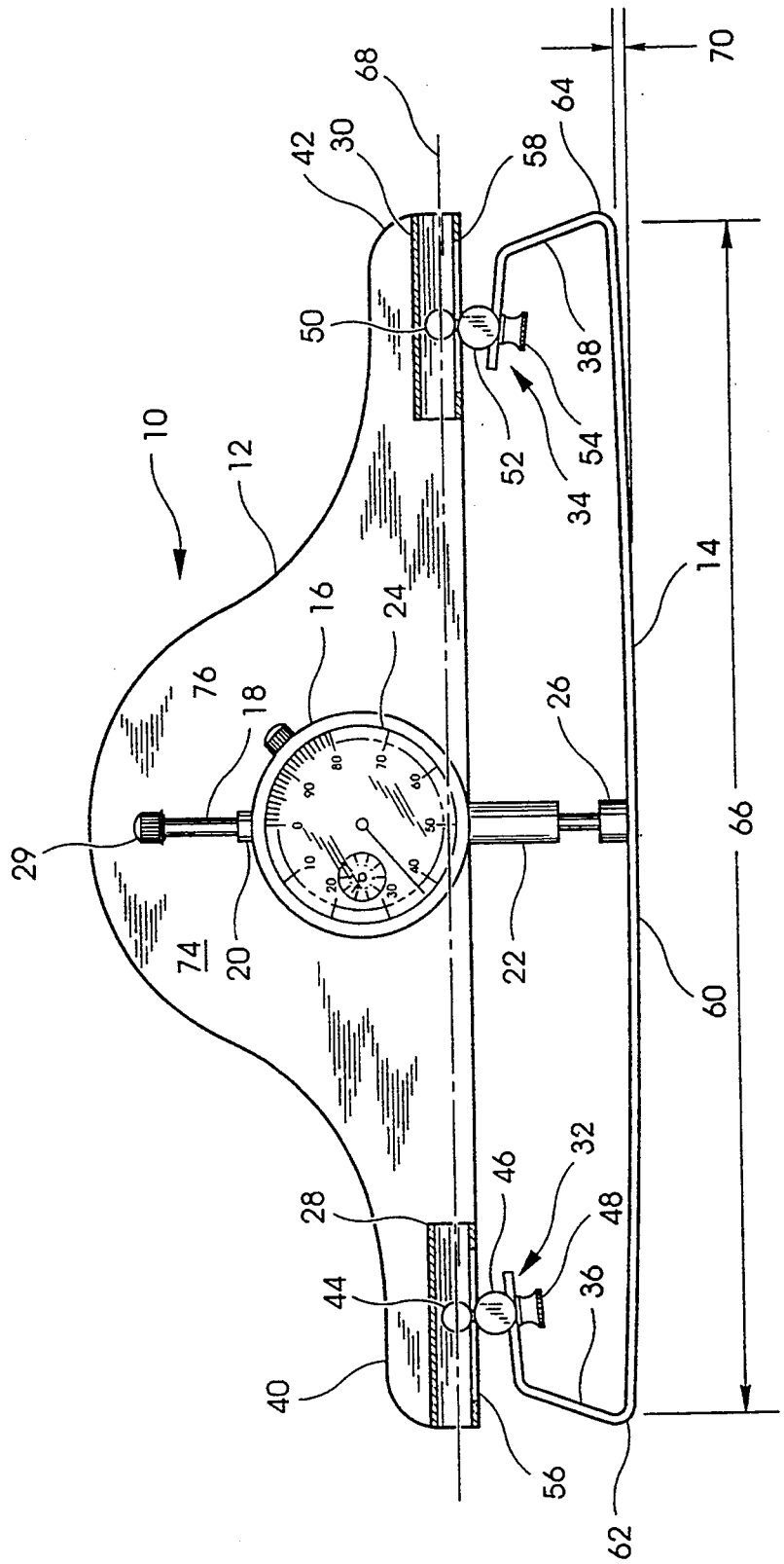
FIG. 1 is a front elevational view of a device for use to measure warpage of a surface according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, a warp measurement device 10 is shown in its free state. Device 10 includes a rigid support plate 12 and a resiliently flexible band 14. A dial indicator 16 mounted to plate 12 provides means for measuring deflection of flexible band 14 relative to support plate 12. Dial indicator 16 includes a longitudinal probe 18 reciprocatably extending therethrough and guided by cylindrical guide portions 20 and 22. Dial indicator 16 is fixed relative to plate 12 and longitudinal probe 18 is fixed relative to band 14 such that movement or deflection of band 14 results in movement of the probe relative to the dial indicator, wherein this movement is detected by the dial indicator and displayed on face 24. In the preferred embodiment, longitudinal probe 18 is attached to band 14 within boss 26 thereof and further includes a stem 29 which facilitates manual depression of the probe. Means for adjustably attaching flexible band 14 to support plate 12 are provided by first and second guide tracks 28 and 30, respectively, attached to support plate 12 and by corresponding first and second guide assemblies 32 and 34 attached at end portions 36 and 38 of flexible band 14, respectively.

Figure 2:
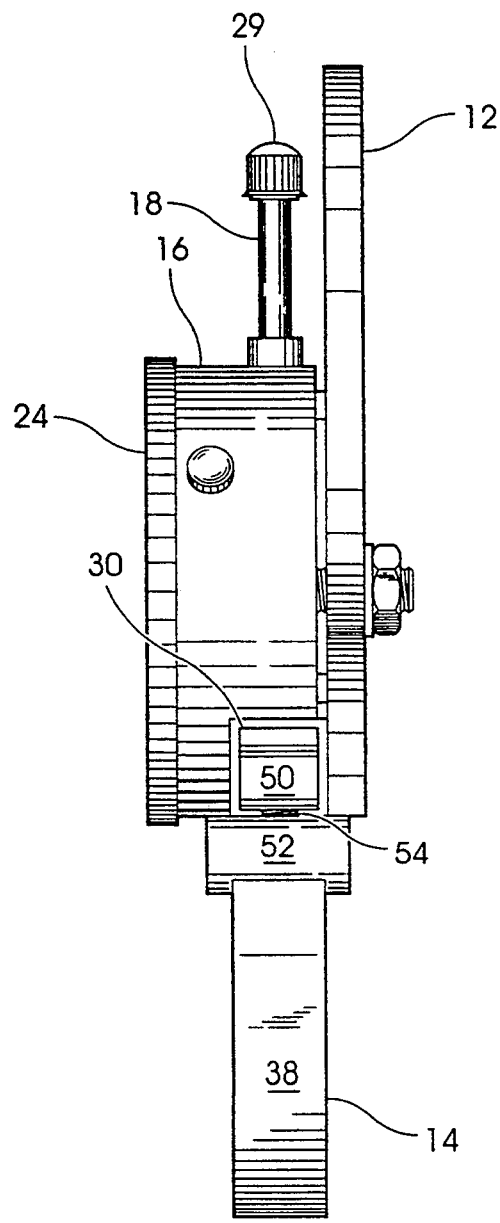
FIG. 2 is a side elevational view of the device shown in FIG. 1.

Referring now also to FIG. 2, first and second guide tracks 28 and 30 are square-shaped tube portions attached at ends 40 and 42 of support plate 12. First guide assembly 32 includes a cylindrical bushing 44 received in tube portion 28 against its bottom internal surface, a cylindrical bushing 46 adjacent to and below tube portion 28, and a thumb screw 48 threadably engaged within cylindrical bushing 44 and slidably received through cylindrical bushing 46. Second guide assembly 34 similarly includes cylindrical bushings 50 and 52 and thumb screw 54. Guide tracks 28 and 30 include slots 56 and 58 which accommodate longitudinal movement of guide assemblies 32 and 34 relative to guide tracks 28 and 30, respectively.

Figure 3:
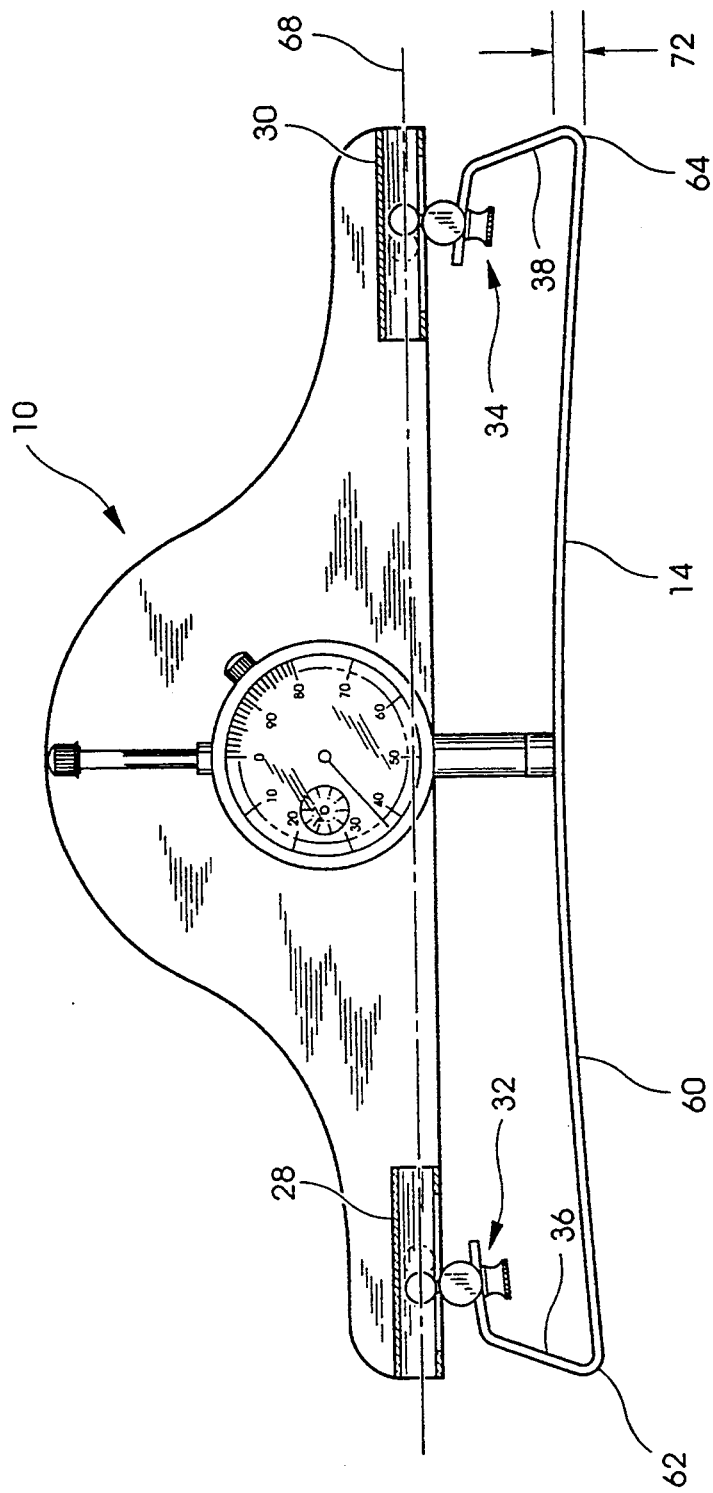
FIG. 3 is a front elevational view of the device shown in FIG. 1 in a deflected position.

Referring now primarily to FIGS. 1 and 3, end portions 36 and 38 of band 14 are U-shaped so as to be substantially rigid and resistant to deflection. Flexible band 14 further includes a resiliently flexible central portion 60 having ends 62 and 64 which define a predetermined length 66 therebetween for contacting and conforming to a surface when placed thereagainst. End portions 36 and 38 locate ends 62 and 64 equidistant from support plate 12, and more specifically, equidistant from a longitudinal axis 68 defined by guide tracks 28 and 30.

As shown in FIG. 1, flexible band 14 in its free state is slightly extended as indicated by dimension 70. As such, device 10 is able to resiliently conform to and measure concave warp profiles of a surface. Referring now to FIG. 3, warp measurement device 10 is shown in its deflected state, wherein flexible band 14 is deflected upwards as indicated by dimension 72 to resiliently conform to and measure convex warp profiles surface. As further shown in FIG. 3, guideassemblies 32 and 34 reciprocate within guide tracks 28 and 30 to accommodate the deflection of flexible band 14 while end portions 36 and 38 maintain ends 62 and 64 equidistant from longitudinal axis 68. As such, central portion 60 of flexible band 14 is able to conform substantially to a surface when placed thereagainst so as to provide an accurate indication of warpage of the surface.

Referring back to FIG. 1, support plate 12 and flexible band 14 are constructed of a clear, extremely durable plastic such as LUCITE ® to reduce shadows and increase visability during usage thereof. Further, support plate 12 includes handhold areas generally indicated at 74 and 76 so that device 10 can be easily gripped to facilitate one hand operation. Flexible band 14 is sized so as to be easily deflected upon contact with a warped surface. As long as the center of flexible band 14 (the immediate area of band 14 adjacent boss 26) and either side of the flexible band 14 are in contact with the warped surface, the band will deflect to conform to the same contour.

In normal usage, stem 29 is not manually depressed since flexible band 14 is sufficiently resilient to conform to a warped surface. However, when measuring lightweight sheets or webs, for example which may flex in response to the inherent resiliencey of the band 14, manual operation of stem 28 may be required to overcome the resilient band so as to properly conform the band to the warped surface.

To facilitate the sliding action of guide assemblies 32 and 34 relative to guide tracks 28 and 30, cylindrical bushings 44, 46, 50 and 52 are constructed of a durable, lubricious material to insure a smooth reciprocating action. For example, guide tracks 28 and 30 may be constructed of a clear plastic such as LUCITE ® and cylindrical bushings 44, 46, 50 and 52 may be constructed of TEFLON ®. Further, thumb screws 48 and 54 are adjustable within cylindrical bushings 44 and 50 to provide optimal sliding contact along guide tracks 28 and 30, respectively. A suggested length for flexible band 14 is twelve (12) inches.

Figure 4:
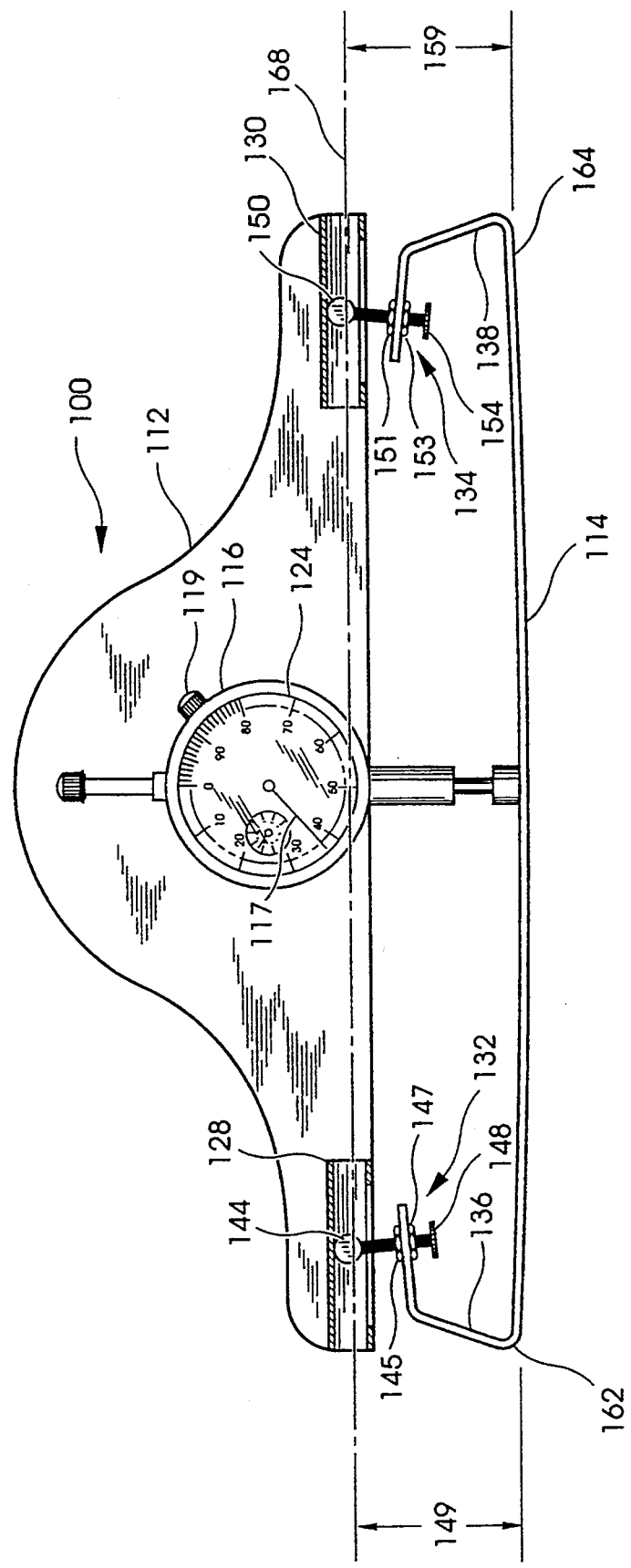
FIG. 4 is a front elevational view of a device for use to measure warpage of a surface according to a second embodiment of the present invention.
Figure 5:
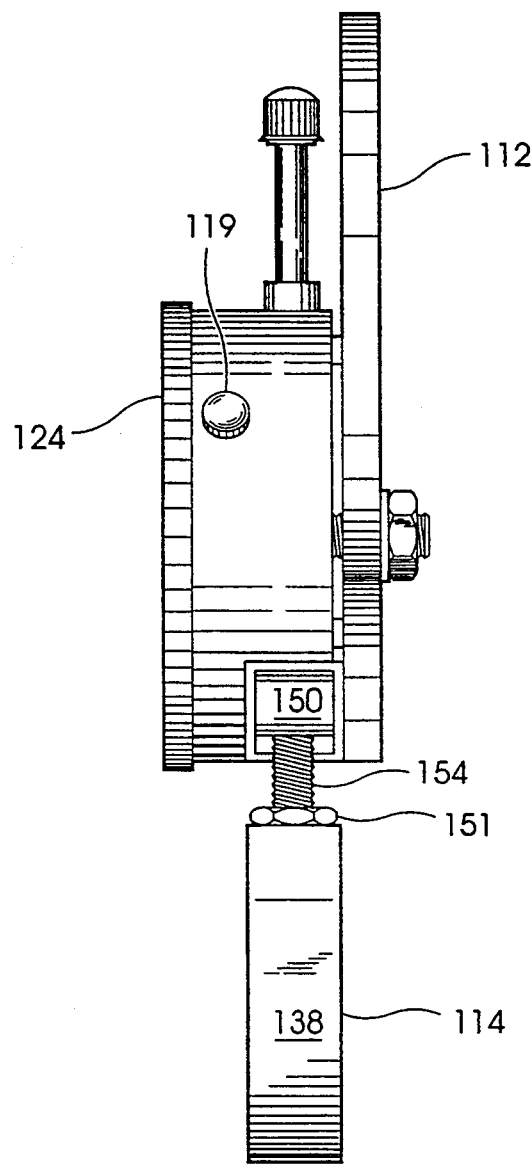
FIG. 5 is a side elevational view of a device shown in FIG. 4.

Referring now to FIGS. 4 and 5, a preferred embodiment of the present invention is depicted, wherein warp measurement device 100 is shown and which can be recalibrated. Device 100, similar to device 10, includes a rigid support plate 112, a resiliently flexible band 114 and a dial indicator 116. Support plate 112 includes square-shaped tube portions 128 and 130 as guide tracks. Unlike guide assemblies 32 and 34 of device 10, however, device 100 includes adjustable guide assemblies 132 and 134. Adjustable guide assembly 132 includes a cylindrical bushing 144 which threadably receives an adjustable thumb screw 148 therein. Unlike bushing 44 of guide assembly 32 of device 10, bushing 144 of guide assembly 132 is received in tube portion 128 against its top surface. As such, by adjusting thumb screw 148, dimension 149 can be altered to calibrate end 162 relative to longitudinal axis 168. Similarly, by adjusting thumb screw 154, dimension 159 can be altered to calibrate end 164. End portions 136 and 138 maintain ends 162 and 164 equidistant from longitudinal axis 168.

Thumb screw 148 is lockably adjustable relative to end portion 136 of flexible band 114 via locking nuts 145 and 147. To adjust dimension 149 for example smaller, either locking nut 145 or 147 is loosened and thumb screw 148 is advanced within cylindrical bushing 144. The appropriate locking nut is then tightened to set dimension 149. Conversely, to adjust dimension 149 larger thumb screw 148 is retracted from cylindrical bushing 144. Adjustable guide assembly 134, similar to guide assembly 132, includes a cylindrical bushing 150, a thumb screw 154 and locking nuts 151 and 153. For proper calibration, ends 162 and 164 should be adjusted via the adjustable guide assemblies 132 and 134 so as to be equidistant from longitudinal axis 168; i.e., dimension 149 equal to dimension 159. When properly calibrated, pointer 117 of dial indicator 116 should align with the zero indicated on face 124. If not, face 124 is rotationally adjustable relative to dial indicator 116 via locking bezzle nut 119.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A device for use to measure warpage of a surface, comprising:
   a rigid support having a longitudinal axis;
   a resiliently flexible member including a resiliently flexible central portion having ends which define a predetermined length therebetween and which are located equidistant from said longitudinal axis, said central portion resiliently deflecting to conform to a concave or convex surface when placed thereagainst;
   means for adjustably attaching said ends to said support so that said ends are maintained parallel to said longitudinal axis as said central portion of said flexible member deflects; and
   means for measuring concave and convex deflection of said flexible member as a function of said predetermined length, said means for measuring including means for detecting and displaying deflection of said flexible member.

2. The device of claim 1, and further comprising means for calibrating said ends equidistant from said longitudinal axis.

3. The device of claim 1 wherein said means for adjustably attaching further comprises:
   first and second guide tracks attached to said support; and
   first and second guides reciprocatably received in said first and second guide tracks;
   wherein said flexible member includes first and second substantially rigid end portions which locate said respective ends equidistant from said longitudinal axis and said first and second guides are attached to said first and second end portions.

4. The device of claim 3, wherein:
   said first and second guide tracks are first and second longitudinal square-shaped tube portions mounted to said support and which define said longitudinal axis; and
   said first and second guides are first and second cylindrical bushings reciprocatably received in said respective first and second tube portions.

5. The device of claim 4, and further comprising:
   third and fourth cylindrical bushings attached to said respective first and second end portions adjacent to said first and second tube portions; and
   first and second thumb screws received through said respective third and fourth cylindrical bushings and threadably engaged within said respective first and second cylindrical bushings;
   wherein said first and second thumb screws are adjustable within said respective first and second cylindrical bushings to slidably clamp said first and second tube portions between said respective first and third cylindrical bushings and second and fourth cylindrical bushings.

6. The device of claim 4, and further comprising means for calibrating said ends equidistant from said longitudinal axis.

7. The device of claim 6, wherein said means for calibrating further comprises:
   first and second thumb screws received through said respective first and second end portions and threadably engaged within said respective first and second cylindrical bushings; and
   means for adjustably locking said first and second thumb screws to said respective first and second end portions;
   wherein said first and second thumb screws are adjustable within said respective first and second cylindrical bushings to calibrate said respective ends equidistant from said longitudinal axis.

8. The device of claim 7, wherein said predetermined length is twelve inches.

9. A device for use to measure warpage of a surface, comprising:
   a rigid support plate;
   first and second guide tracks attached to said support plate;
   a resiliently flexible band extending between said first and second guide tracks;
   first and second guides attached to said band, said first and second guides being reciprocatably received in said first and second guide tracks; and
   means, mounted to said plate, for measuring deflection of said band toward and away from said plate, said means for measuring including probe means attached to said band for detecting deflection of said band relative to said plate and means for displaying deflection of said band relative to said plate;
   wherein said band resiliently deflects to conform to a concave or convex surface when placed thereagainst, said first and second guides reciprocating in said respective first and second guide tracks as said band deflects.

10. The device of claim 9, wherein:
    said resiliently flexible band includes a resiliently flexible central portion having ends which define a predetermined length therebetween and are located equidistant from a longitudinal axis defined by said first and second guide tracks, said central portion resiliently deflecting to conform to a surface when placed thereagainst; and
    said means for measuring displays deflection of said flexible band as a function of said predetermined length.

11. The device of claim 10, wherein:
    said first and second guide tracks are first and second longitudinal square-shaped tube portions mounted to said plate and which define said longitudinal axis; and
    said first and second guides are first and second cylindrical bushings reciprocatably received in said respective first and second tube portions.

12. The device of claim 11, and further comprising means for calibrating said ends equidistant from said longitudinal axis.

13. The device of claim 9, wherein:
    said means for measuring is a dial indicator and said probe means is a longitudinal probe extending from below said dial indicator to a stem above said dial indicator.

14. The device of claim 9, and further comprising a handle attached to said support plate.

15. The device of claim 9, wherein said support plate is constructed of a non-opaque material.

16. The device of claim 10, wherein said predetermined length is twelve inches.

* * * * *